(12) United States Patent
Bernbo et al.

(10) Patent No.: US 8,997,124 B2
(45) Date of Patent: Mar. 31, 2015

(54) METHOD FOR UPDATING DATA IN A DISTRIBUTED DATA STORAGE SYSTEM

(75) Inventors: Stefan Bernbo, Kariskrona (SE);
Christian Melander, Rodeby (SE);
Roger Persson, Kariskrona (SE);
Gustav Petersson, Sturko (SE)

(73) Assignee: Compuverde AB (SE)

( * ) Notice: Subject to any disclaimer, the term of this patent is extended or adjusted under 35 U.S.C. 154(b) by 3 days.

(21) Appl. No.: 13/224,446

(22) Filed: Sep. 2, 2011

(65) Prior Publication Data

US 2013/0061253 A1    Mar. 7, 2013

(51) Int. Cl.
*G06F 9/44* (2006.01)
*G06F 3/06* (2006.01)
*G06F 17/30* (2006.01)

(52) U.S. Cl.
CPC .............. *G06F 3/061* (2013.01); *G06F 3/0643* (2013.01); *G06F 3/067* (2013.01); *G06F 17/30212* (2013.01)
USPC ........... 719/328; 707/770; 707/822; 707/827; 707/828; 707/829

(58) Field of Classification Search
None
See application file for complete search history.

(56) References Cited

U.S. PATENT DOCUMENTS

| | | | |
|---|---|---|---|
| 3,707,707 A | 12/1972 | Spencer et al. | |
| 5,787,247 A | 7/1998 | Norin et al. | |
| 6,003,065 A | 12/1999 | Yan et al. | |
| 6,021,118 A | 2/2000 | Houck et al. | |
| 6,055,543 A | 4/2000 | Christensen et al. | |
| 6,389,432 B1 | 5/2002 | Pothapragada et al. | |
| 6,470,420 B1 | 10/2002 | Hospodor | |
| 6,782,389 B1 | 8/2004 | Chrin et al. | |
| 6,925,737 B2 | 8/2005 | Bolduan et al. | |
| 6,985,956 B2 | 1/2006 | Luke et al. | |
| 7,200,664 B2 | 4/2007 | Hayden | |
| 7,206,836 B2 | 4/2007 | Dinker et al. | |
| 7,266,556 B1 | 9/2007 | Coates | |
| 7,320,088 B1 | 1/2008 | Gawali | |
| 7,340,510 B1 | 3/2008 | Liskov et al. | |
| 7,352,765 B2 | 4/2008 | Dai et al. | |

(Continued)

FOREIGN PATENT DOCUMENTS

EP    774723 A3    7/1998
EP    934568 B1    6/2003

(Continued)

OTHER PUBLICATIONS

U.S. Appl. No. 13/224,393, filed Sep. 2, 2011, Bernbo et al.

(Continued)

*Primary Examiner* — H S Sough
*Assistant Examiner* — Umut Onat
(74) *Attorney, Agent, or Firm* — Condo Roccia Koptiw LLP

(57) ABSTRACT

There is provided a method implemented in a data storage system including a plurality of storage nodes connected to each other via a communications network. At least one storage node of the plurality of storage nodes may store a first data item. The data item may be arranged to include a reference to a second data item stored in the data storage system. The method may include providing an identifier of the second data item. The method may also include providing status information about the first data item. The identifier may be used to update the first data item, for example based on the status information. The first data item may be stored at the at least one storage node.

18 Claims, 4 Drawing Sheets

(56) References Cited

U.S. PATENT DOCUMENTS

| | | |
|---|---|---|
| 7,406,484 B1 | 7/2008 | Srinivasan et al. |
| 7,487,305 B2 | 2/2009 | Hill et al. |
| 7,503,052 B2 | 3/2009 | Castro et al. |
| 7,546,486 B2 | 6/2009 | Slik et al. |
| 7,568,069 B2 | 7/2009 | Jantz et al. |
| 7,590,672 B2 | 9/2009 | Slik et al. |
| 7,593,966 B2 | 9/2009 | Therrien et al. |
| 7,624,155 B1 | 11/2009 | Nordin et al. |
| 7,624,158 B2 | 11/2009 | Slik et al. |
| 7,631,023 B1 | 12/2009 | Kaiser et al. |
| 7,631,045 B2 | 12/2009 | Boerries et al. |
| 7,631,313 B2 | 12/2009 | Mayhew et al. |
| 7,634,453 B1 | 12/2009 | Bakke et al. |
| 7,647,329 B1 | 1/2010 | Fischman et al. |
| 7,769,711 B2 | 8/2010 | Srinivasan et al. |
| 7,778,972 B1 | 8/2010 | Cormie et al. |
| 7,822,766 B2 * | 10/2010 | Arndt et al. ............... 707/770 |
| 7,840,992 B1 | 11/2010 | Dufrene et al. |
| 7,873,650 B1 | 1/2011 | Chapman et al. |
| 7,885,982 B2 * | 2/2011 | Wight et al. ................. 707/802 |
| 8,060,598 B1 | 11/2011 | Cook et al. |
| 8,073,881 B1 | 12/2011 | Georgiev |
| 8,190,561 B1 | 5/2012 | Poole et al. |
| 8,255,430 B2 | 8/2012 | Dutton et al. |
| 8,296,398 B2 | 10/2012 | Lacapra et al. |
| 8,417,828 B2 | 4/2013 | Ma et al. |
| 8,561,115 B2 | 10/2013 | Hattori et al. |
| 8,577,957 B2 | 11/2013 | Behar et al. |
| 2001/0034812 A1 | 10/2001 | Ignatius et al. |
| 2001/0047400 A1 | 11/2001 | Coates et al. |
| 2002/0042693 A1 | 4/2002 | Kampe et al. |
| 2002/0103888 A1 | 8/2002 | Janz et al. |
| 2002/0114341 A1 | 8/2002 | Sutherland et al. |
| 2002/0145786 A1 | 10/2002 | Chang et al. |
| 2003/0026254 A1 | 2/2003 | Sim |
| 2003/0120654 A1 * | 6/2003 | Edlund et al. ................. 707/7 |
| 2003/0126122 A1 | 7/2003 | Bosley et al. |
| 2003/0154238 A1 | 8/2003 | Murphy et al. |
| 2003/0172089 A1 | 9/2003 | Douceur et al. |
| 2003/0177261 A1 | 9/2003 | Sekiguchi et al. |
| 2004/0059805 A1 | 3/2004 | Dinker et al. |
| 2004/0064729 A1 | 4/2004 | Yellepeddy |
| 2004/0078466 A1 | 4/2004 | Coates et al. |
| 2004/0088297 A1 | 5/2004 | Coates et al. |
| 2004/0111730 A1 | 6/2004 | Apte |
| 2004/0243675 A1 | 12/2004 | Taoyama et al. |
| 2004/0260775 A1 | 12/2004 | Fedele |
| 2005/0010618 A1 | 1/2005 | Hayden |
| 2005/0015431 A1 | 1/2005 | Cherkasova |
| 2005/0015461 A1 * | 1/2005 | Richard et al. ............... 709/217 |
| 2005/0038990 A1 | 2/2005 | Sasakura et al. |
| 2005/0044092 A1 | 2/2005 | Adya et al. |
| 2005/0177550 A1 | 8/2005 | Jacobs et al. |
| 2005/0193245 A1 | 9/2005 | Hayden et al. |
| 2005/0204042 A1 | 9/2005 | Banerjee et al. |
| 2005/0246393 A1 | 11/2005 | Coates et al. |
| 2005/0256894 A1 | 11/2005 | Talanis et al. |
| 2005/0278552 A1 | 12/2005 | Delisle et al. |
| 2005/0283649 A1 | 12/2005 | Turner et al. |
| 2006/0031230 A1 | 2/2006 | Kumar |
| 2006/0031439 A1 | 2/2006 | Saffre |
| 2006/0080574 A1 | 4/2006 | Saito et al. |
| 2006/0090045 A1 | 4/2006 | Bartlett et al. |
| 2006/0090095 A1 | 4/2006 | Massa et al. |
| 2006/0112154 A1 | 5/2006 | Douceur et al. |
| 2007/0022087 A1 | 1/2007 | Bahar et al. |
| 2007/0022121 A1 | 1/2007 | Bahar et al. |
| 2007/0022122 A1 | 1/2007 | Bahar et al. |
| 2007/0022129 A1 | 1/2007 | Bahar et al. |
| 2007/0055703 A1 | 3/2007 | Zimran et al. |
| 2007/0088703 A1 | 4/2007 | Kasiolas et al. |
| 2007/0094269 A1 | 4/2007 | Mikesell et al. |
| 2007/0094354 A1 | 4/2007 | Soltis |
| 2007/0198467 A1 | 8/2007 | Wiser et al. |
| 2007/0276838 A1 | 11/2007 | Abushanab et al. |
| 2007/0288494 A1 | 12/2007 | Chrin et al. |
| 2007/0288533 A1 | 12/2007 | Srivastava et al. |
| 2007/0288638 A1 | 12/2007 | Vuong et al. |
| 2008/0043634 A1 | 2/2008 | Wang et al. |
| 2008/0077635 A1 | 3/2008 | Sporny et al. |
| 2008/0104218 A1 | 5/2008 | Liang et al. |
| 2008/0109830 A1 | 5/2008 | Giotzbach et al. |
| 2008/0168157 A1 | 7/2008 | Marchand |
| 2008/0171556 A1 | 7/2008 | Carter |
| 2008/0172478 A1 * | 7/2008 | Kiyohara et al. ............. 709/220 |
| 2008/0198752 A1 | 8/2008 | Fan et al. |
| 2008/0235321 A1 | 9/2008 | Matsuo |
| 2008/0270822 A1 | 10/2008 | Fan et al. |
| 2009/0043922 A1 | 2/2009 | Crowther |
| 2009/0083810 A1 | 3/2009 | Hattori et al. |
| 2009/0132543 A1 | 5/2009 | Chatley et al. |
| 2009/0172211 A1 | 7/2009 | Perry et al. |
| 2009/0172307 A1 | 7/2009 | Perry et al. |
| 2009/0228669 A1 | 9/2009 | Slesarev et al. |
| 2009/0271412 A1 | 10/2009 | Lacapra et al. |
| 2009/0287842 A1 | 11/2009 | Plamondon |
| 2010/0115078 A1 | 5/2010 | Ishikawa et al. |
| 2010/0161138 A1 | 6/2010 | Lange et al. |
| 2010/0169391 A1 | 7/2010 | Baptist et al. |
| 2010/0169415 A1 | 7/2010 | Leggette et al. |
| 2010/0185693 A1 | 7/2010 | Murty et al. |
| 2010/0198888 A1 * | 8/2010 | Blomstedt et al. ............ 707/827 |
| 2010/0198889 A1 | 8/2010 | Byers et al. |
| 2010/0223262 A1 | 9/2010 | Krylov et al. |
| 2010/0303071 A1 | 12/2010 | Kotalwar et al. |
| 2011/0055353 A1 | 3/2011 | Tucker et al. |
| 2011/0072206 A1 | 3/2011 | Ross et al. |
| 2011/0125814 A1 | 5/2011 | Slik et al. |
| 2011/0252204 A1 | 10/2011 | Coon et al. |
| 2012/0331021 A1 | 12/2012 | Lord |
| 2013/0060884 A1 | 3/2013 | Bernbo et al. |
| 2013/0103851 A1 | 4/2013 | Umeki et al. |

FOREIGN PATENT DOCUMENTS

| | | |
|---|---|---|
| EP | 1521189 A2 | 4/2005 |
| EP | 1578088 A2 | 9/2005 |
| EP | 1669850 A1 | 6/2006 |
| EP | 1798934 A1 | 6/2007 |
| EP | 2031513 A2 | 3/2009 |
| JP | 06348527 A | 12/1994 |
| JP | 11249874 A | 9/1999 |
| JP | 2000322292 A | 11/2000 |
| JP | 2003030012 A | 1/2003 |
| JP | 2003223286 A | 8/2003 |
| JP | 2003248607 A | 9/2003 |
| JP | 2003271316 A | 9/2003 |
| JP | 2007058275 A | 3/2007 |
| JP | 2008250767 A | 10/2008 |
| JP | 2009259007 A | 11/2009 |
| WO | WO 99/38093 A1 | 7/1999 |
| WO | WO-0118633 A1 | 3/2001 |
| WO | WO-0235359 A2 | 5/2002 |
| WO | WO 02/44835 A2 | 6/2002 |
| WO | WO-2004053677 A2 | 6/2004 |
| WO | WO 2006/124911 A2 | 11/2006 |
| WO | WO 2007/014296 A2 | 2/2007 |
| WO | WO 2007/115317 A2 | 10/2007 |
| WO | WO-2007134918 A1 | 11/2007 |
| WO | WO-2008069811 A1 | 6/2008 |
| WO | WO-2008102195 A1 | 8/2008 |
| WO | WO 2009/048726 A1 | 4/2009 |
| WO | WO 2010/046393 A2 | 4/2010 |
| WO | WO 2010/080533 A2 | 7/2010 |
| WO | WO 2011/131717 A1 | 10/2011 |

OTHER PUBLICATIONS

U.S. Appl. No. 13/224,404, filed Sep. 2, 2011, Bernbo et al.
U.S. Appl. No. 13/224,415, filed Sep. 2, 2011, Bernbo et al.
U.S. Appl. No. 13/224,424, filed Sep. 2, 2011, Bernbo et al.
U.S. Appl. No. 13/224,433, filed Sep. 2, 2011, Bernbo et al.
U.S. Appl. No. 13/125,524, filed Apr. 21, 2011, Bernbo et al.
U.S. Appl. No. 13/174,350, filed Jun. 30, 2011, Bernbo et al.

(56) References Cited

OTHER PUBLICATIONS

Anonymous: "Squid configuration directive reply_body_max_size", Dec. 21, 2008, pp. 1-2. XP55042055, Retrieved from the Internet: URL:http://web.archive.org/web/20081221142145/http://www.squid-cache.org/Doc/config/reply_body_max_size/ [retrieved on Oct. 24, 2012], p. 1.

Anonymous: "FAQ: How do I block large files by Content Size before download?", Mar. 23, 2009, pp. 1-2, XP55042048, Retrieved from the Internet: URL:http://www.trustwave.com/support/kb/article.aspx?id=13166, [retrieved on Oct. 24, 2012], p. 1.

Anonymous: "Queues for Prioritized Message Processing", Feb. 6, 2009, p. 1, XP55042195, Retrieved from the Internet: URL:http://web.archive.org/web/20090206110207/http://help.sap.com/saphelp_nw04/helpdata/en/04/827440c36ed562e10000000a155106/content.htm, [retrieved on Oct. 25, 2012], p. 1.

Anonymous: "FastTrack", Jan. 8, 2011, pp. 1-3, XP55041807, Retrieved from the Internet: URL:http://de.wikipedia.org/w/index.php?title=FastTrack&oldid=83614953 [retrieved on Oct. 22, 2012], pp. 1-2.

Anonymous: "Load balancing (computing)", Aug. 25, 2011, pp. 1-6, XP55041742, Retrieved from the Internet: URL:http://en.wikipedia.org/w/index.php?title=Load_balancing_%28computing%29&oldid=446655159 [retrieved on Oct. 22, 2012], pp. 1-5.

U.S. Appl. No. 13/170,672, filed Jun. 28, 2011, Bernbo et al.
U.S. Appl. No. 13/170,735, filed Jun. 28, 2011, Bernbo et al.
International Patent Application No. PCT/EP2009/63796: Written Opinion, Jan. 18, 2010, 6 pages.
International Patent Application No. PCT/EP2009/63796: International Preliminary Report on Patentability, Jan. 12, 2011, 5 pages.
International Patent Application No. PCT/EP2011/056317: International Search Report, Aug. 9, 2011, 4 pages.
Tang et al., "An Efficient Data Location Protocol for Self-organizing Storage Clusters", Supercomputing, ACM/IEEE Conference, Phoenix, AZ, USA, Nov. 15-21, 2003, 1-13.
Weatherspoon et al., "Antiquity: Exploiting a Secure Log for Wide-Area Distributed Storage", Proceedings of the 2007 EuroSys Conference, ACM 2007, Lisbon, Portugal, Mar. 21-23, 2007, 371-384.
Nancy P. Kronenberg et al., "VAXclusters: A Closely-Coupled Distributed System, ACM Transactions on Computer Systems", vol. 4, No. 2, May 1986, pp. 130-146.
HP Volume Shadowing for OpenVMS, "Introduction to Volume Shadowing for OpenVMS", OpenVMS Alpha 7.3-2, Sep. 2003.
Keith Parris, "Using OpenVMS Clusters for Diaster Tolerance", HP Services—Systems Engineering.
Wataru Katsurashima et al., "NAS Switch: A novel CIFS server virtualization", IEEE, 2003.

* cited by examiner

METHOD FOR UPDATING DATA IN A DISTRIBUTED DATA STORAGE SYSTEM

CROSS-REFERENCE TO RELATED APPLICATIONS

This application includes subject matter that may be related to subject matter included in the following applications: U.S. patent application Ser. No. 13/224,393 entitled "A Method And Device For Maintaining Data In A Data Storage System Comprising A Plurality Of Data Storage Nodes," filed Sept. 2, 2011; U.S. patent application Ser. No. 13/224,404 entitled "Method And Device For Writing Data To A Data Storage System Comprising A Plurality Of Data Storage Nodes," filed Sept. 2, 2011; U.S. patent application Ser. No. 13/224,415 entitled "Method For Data Maintenance," filed Sept. 2, 2011; U.S. patent application Ser. No. 13/224,424 entitled "Method For Handling Requests In A Storage System And Storage Node For A Storage System," filed Sept. 2, 2011; and U.S. patent application Ser. No. 13/224,433 entitled "Method For Data Retrieval From A Distributed Data Storage System," filed Sept. 2, 2011.

FIELD OF INVENTION

The present disclosure is generally related to methods for updating data in a distributed data storage system comprising a plurality of storage nodes. Moreover, the present concept relates to a server adapted to implement such a method.

BACKGROUND OF THE INVENTION

One way to store and share large amounts of date is to utilize data storage systems including a large number of storage facilities at geographically disparate locations. Such systems may decrease the risk of data corruption and the risk of data getting lost.

There are a number of methods for writing and maintaining data in such a data storage system, and updating data may use numerous computing resources.

Updating data, especially smaller blocks of data, in such a data storage system while at the same time operating safely and robustly may be difficult.

SUMMARY OF THE INVENTION

A method for implementing an updating operation in a data storage system including a plurality of storage nodes is disclosed. The method for updating data stored in a data storage system including a plurality of storage nodes may include receiving status information regarding a first data item stored on a first storage node. The method may also include receiving an identifier of a second data item stored on a second storage node. A reference to the second data item may be included in the first data item. The method may include sending an update of the first data item to the first storage node based on the received status information. The update may include the identifier.

According to an example, there is provided a method implemented in a data storage system including a plurality of storage nodes connected to each other via a communications network. At least one storage node of the plurality of storage nodes may store a first data item. The data item may be arranged to include a reference to a second data item stored in the data storage system. The method may include providing an identifier of the second data item. The method may also include providing status information about the first data item.

The identifier may be used to update the first data item, for example based on the status information. The first data item may be stored at the at least one storage node.

By providing status information about the first data item as well as an identifier for the second data item to a device (e.g. a device internal or external to the data storage system), from which the updating process is controlled, the number of communications between this device and the storage nodes may be reduced when updating the first data item.

A virtual directory structure may easily be updated in the data storage system where the data items, such as data files, are stored in an unstructured manner.

Thus, the updating operation in a data storage system including a plurality of storage nodes may be rendered more effective.

An example method may be implemented as software/hardware combination implementations which are executed on a server or some other data writing device. In another example, the method may be embodied as software/hardware combination implementations which are executed on one or several storage nodes included in the data storage system.

According to one embodiment, the updating may be performed by means of an application programming interface (API). For example, by using an API, the method may be implemented on many different computing platforms.

According to one embodiment, the API may be implemented on a server in communication with the at least one storage node. The method may be implemented on a dedicated device, for example a device provided by a third party that may not be responsible for the maintenance of the storage nodes.

According to an example embodiment, the API may be implemented in a storage node included in the data storage system. In this example, the number of access points into the storage system may be increased.

According to an example embodiment, the status information may be cached from a previous access to the first data item.

According to an example embodiment, the identifier may be cached from a previous access to the second data item.

By storing the status information and/or the identifier in a cache memory, the status information may be provided quickly to a device, internal or external to the data storage system, from which the updating process may be controlled. For example, the previous access may be a read or write operation.

According to an embodiment, the updating may include at least one of appending data to an existing data file included in the first data item or overwriting an existing data file included in the first data item.

According to an example embodiment, the status information may include storage location information of the first data item stored at the at least one storage node. By providing storage location information, one may obtain notification about which of the plurality of storage nodes that are storing the first data item, as well as information about the identifier, or key, of the first data item.

According to an example embodiment, the status information may include information about a free storage space condition at the at least one storage node.

According to one embodiment, the status information may include information about a load condition at the at least one storage node.

In an example, the information about the free storage space condition and/or the load condition may affect the method of updating. For example, the updating act of a first data item stored at a particular storage node may be interrupted if the available storage space at the storage node is insufficient and/or if the load condition at the storage node is too large.

According to an example embodiment, the act of updating may be initiated on condition that the size of the second data item is smaller than a predetermined value. The method may be made more efficient by handling data items having small sizes. In one example, the method may be performed only if the first data item is below a predetermined size.

According to an example embodiment, the status information about the first data item may be provided at regular (e.g. periodic) time intervals. In this way, the status information may be kept up to date.

According to an example embodiment, the method may further include receiving an acknowledgement from the at least one storage nodes. The acknowledgement may include information about the act of updating. The acknowledgement may include information about whether the updating process was successful or not. The device may re-perform the updating process if the acknowledgement is not received.

According to an example embodiment, at least one of the acts of providing an identifier of the second data item, providing status information about the first data item and updating the first data item may be repeated on a condition of a negative acknowledgement. An advantage of this embodiment is that the process of updating may be repeated, for example in the case of a malfunction, thereby improving the quality and reliability.

According to an example embodiment, the act of updating may be implemented by means of unicast messages. Unicast messages may allow the first data item will be updated in a bandwidth-effective manner.

Exemplary systems include a data storage system including a plurality of data storage nodes connected to each other via a communications network. At least one storage node of the plurality of storage nodes may be arranged to store a first data item. The data item may be arranged to include a reference to a second data item stored in the data storage system. The data storage system may include an application programming interface (API), which may be configured to receive an identifier of the second data item. The API may be configured to receive status information about the first data item. The API, based on the status information, may be configured to update the first data item, stored at the at least one storage node, with the identifier.

In an example, a storage node may be configured to send status information to a server regarding a first data item stored on a first storage node. The storage node may receive an update of the first data item from the server. The update may include an identifier forwarded by the server from a second storage node that stores a second data item that includes a reference to the first data item. The storage node may update the first data item based on the received update.

Other features and structures of the disclosed systems and methods will become apparent to those skilled in the art upon review of the following drawings, the detailed description, and the appended claims.

BRIEF DESCRIPTION OF THE DRAWINGS

The above, as well as additional objects, features, and structures of the disclosed systems and methods, will be better understood through the following illustrative and non-limiting detailed description of example embodiments, with reference to the appended drawings, where like reference numerals will be used for like elements, wherein.

DETAILED DESCRIPTION

Figure 1:
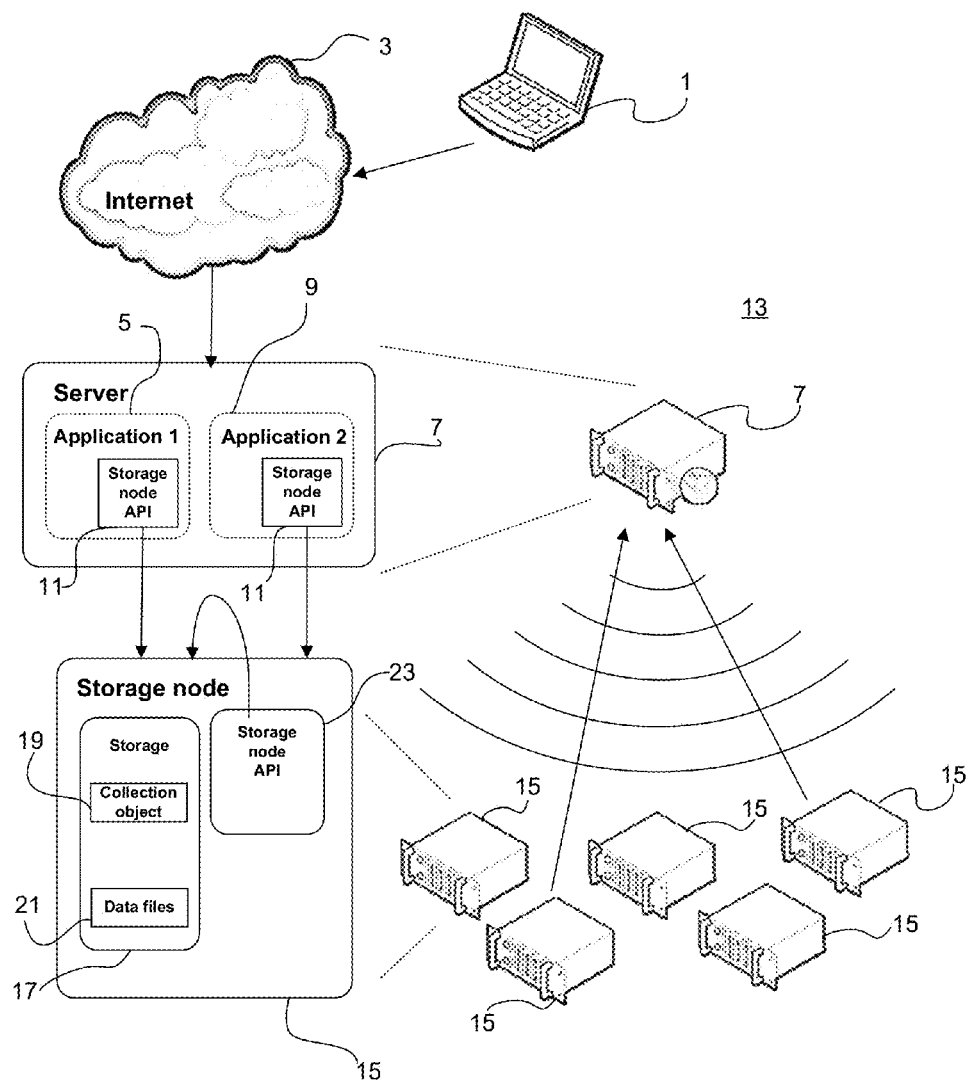
FIG. 1 illustrates an example distributed storage system.

The structure and architecture of an example of a distributed data storage system 13 is outlined schematically in FIG. 1. The distributed data storage system 13 may include a plurality of storage nodes 15, which may be in communication with a server 7, as will be described below.

FIG. 1 illustrates an example client-server configuration, according to which a user computer 1 may access applications 5, 9 via the Internet 3, where the applications 5, 9 are run on a server 7. In FIG. 1, two applications 5, 9 may run on the server 7. It is understood, however, that any number of applications may run on the server 7. Each application 5, 9 may include an API (Application Programming Interface) 11 which may provide an interface in relation to the distributed data storage system 13. For example, API 11 may supports requests, for example write and read requests, from the applications running on the server. From an application's point of view, reading or writing information from/to the data storage system 13 may appear to be the same as using any other type of storage solution, for instance a file server or a hard drive.

Each API 11 may communicate with storage nodes 15 in the data storage system 13. The storage nodes 15 may communicate with each other. Storage nodes 15 may include storage node API 23. Each storage node 15 may include a network interface card (NIC), for example so that the storage node may receive and send data to/from other storage nodes 15 and the server 7. The communications may be based on TCP (Transmission Control Protocol) and UDP (User Datagram Protocol), although other communication methods/protocols may be implemented.

It should be noted that different APIs 11 on the same server 7 may access different sets of storage nodes 15. It should be further noted that there may exist more than one server 7 which accesses each storage node 15. The storages nodes may operate in a similar manner even though multiple servers may access the data storage system.

The components of the distributed data storage system may include the storage nodes 15 and the APIs 11 in the server 7 which may access the storage nodes 15. For example, the methods for updating and accessing the data may be implemented on server 7 in FIG. 1. In another example, the methods may be carried out in one, or several, of the storage nodes 15. Those methods may be embodied as software/hardware combination implementations which may be executed on the server 7 and/or on at least one of the storage nodes 15. The methods may include determining the operation and the properties of the overall distributed data storage system 13.

The storage node 15 may typically be similar to a file server which may be comprised of a number of functional blocks. The storage node 15 may thus include a tangible storage medium 17, which for example may include a number of internal (e.g. connected via Integrated Device Electronics (IDE) or Serial Advance Technology Attachment (SATA)) or external hard drives (e.g. connected via Universal Serial Bus (USB) or Firewire), optionally configured as a RAID (Redundant Array of Independent Disk) system. Other types of storage media are however conceivable as well.

Each storage node 15 may contain a node list including the IP addresses of all storage nodes in its set or group of storage nodes, or a subset thereof. The number of storage nodes in a group may vary from a few to hundreds to thousands of storage nodes.

The storage nodes 15 of the distributed data storage system 13 may be considered to be in the same hierarchical level. In other words, there may not be a dedicated "master" node that is responsible for maintaining a directory of stored data entities and monitoring data consistency, etc. Instead, each of the storage nodes 15 may be considered equal, and may, at times, carry out data management operations vis-à-vis other storage nodes 15 in the system. This equality may ensure that the system is robust. In case of a storage node malfunction, other nodes in the system may step in for the malfunctioning node and ensure reliable data storage.

According to the example illustrated in FIG. 1, the server 7 may exist at a different hierarchy level than the storage nodes 15. It is noted, however, that the server functionality as described in the present context may equally well be implemented in any, or several, of the storage nodes 15 included in the data storage system 13. This alternative implementation of the server functionality may give rise to a different, equally applicable, hierarchical structure of the data storage system 13.

The reading of data, as well as other functions in the system, may utilize multicast communication to communicate simultaneously with a plurality of storage nodes. Exemplary multicast or IP multicast communications may be a point-to-multipoint communication which may be accomplished by sending a message to an IP address which is reserved for multicast applications. For example, a message, for example a request, may be sent to such an IP address (e.g. 244.0.0.1), and a number of recipient servers may be registered as subscribers to that IP address. Each of the recipient servers may include its own IP address. When a switch in the network receives the message directed to 244.0.0.1, the switch may forward the message to the IP addresses of each server registered as a subscriber.

In principle, a single server may be registered as a subscriber to a multicast address, in which case a point-to-point, communication may be achieved. However, in the context of this disclosure, such a communication may nevertheless be considered a multicast communication since a multicast scheme is employed.

Unicast communication may also be employed, for example a communication with a single recipient.

The tangible storage medium 17 may store one or more data items 19, 21 in the form of collection objects 19 and/or payload data in the form of data files 21. A collection object 19 may include a set of references. A reference may be a reference to one or more data files stored in the storage system (e.g. data files 21). A reference may also be a reference to another collection object 19 stored in the storage system. A reference may include a pointer (e.g. a memory address) to a storage location of a storage node 15. A reference may include an identifier of the collection object or data file referred to.

The collection object 19 may be used for implementing a structured layer in the data storage system 13. Data files 21 referenced in the collection object 19 may represent data files stored in the structure. Additional collection objects 19 referenced in the collection object 19 may represent subdirectories stored in the directory.

A collection object 19 may be a data object having a predetermined format. The data object may be a special file in the file system of the storage medium 17 in the sense that it may be a binary file to be interpreted by the API. In an example, the data object may be a standard data file in the file system of the storage medium 17. The data object may be a text file indicating the referenced collection objects 19 and/or data files 21. A data object may be readable using the same routines of the file system as the data files 21.

Figure 2:
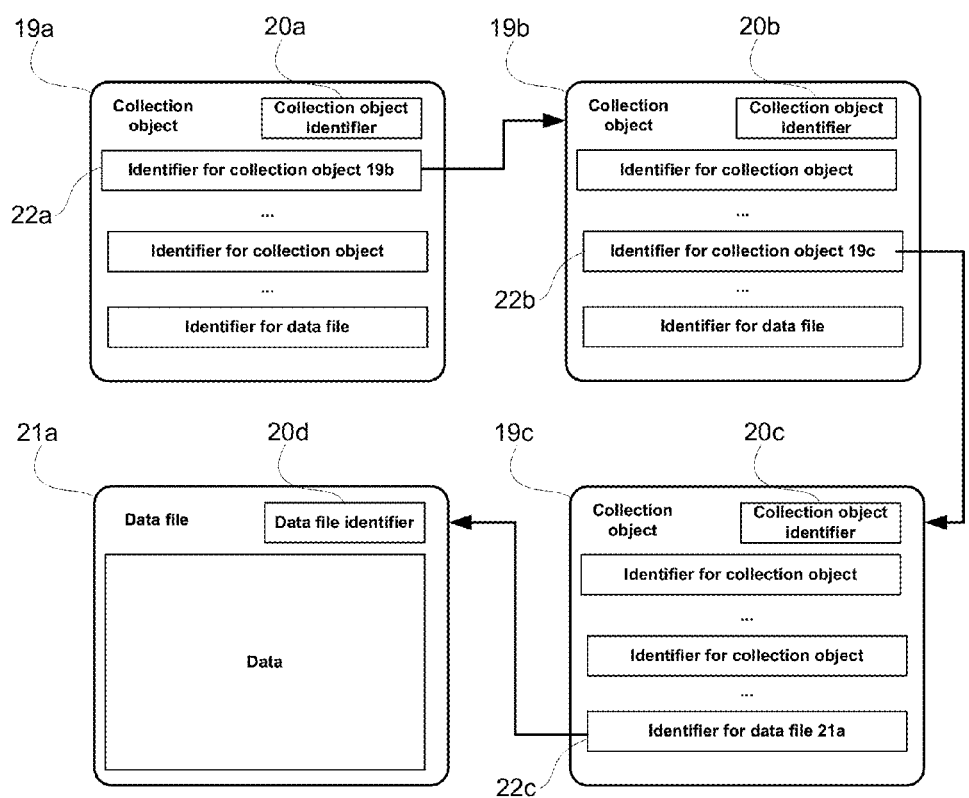
FIG. 2 is a schematic block diagram of an example data items stored in the data storage system.

FIG. 2 schematically illustrates an example collection object 19a according to an example embodiment. The collection object 19a may have an associated collection object identifier 20a. The identifier 20a may for instance be a Universally Unique Identifier (UUID). The collection object identifier 20a may be included in a header of the collection object 19a. However, the collection object identifier 20a may not be included in the collection object 19a. For example, the collection object identifier 20a may be stored in a register maintained at the storage node 15 and/or at the server 7. The collection object identifier 20a may associate the collection object 19a with the collection object identifier 20a, for example by pointing out the memory address where the collection object 19a may be found. Thus, the collection object 19a may form a first data item which may be identified by a first unique key.

The collection object 19a may include a field 22a with an identifier 20b of another collection object 19b, for example in the form of a string. The collection object 19a may include a reference to the collection object 19b. The collection object 19b may be stored on the same storage node as the collection object 19a or on another storage node than the collection object 19a. The storage system may use the identifier 20b in the field 22a to locate and access the collection object 19b. Thus, the collection object 19b may form a second data item which is identified by a second unique key.

Similarly to the collection object 19a, the collection object 19b may include a field 22b with an identifier 20c of a third collection object 19c. The collection object 19c may include a field 22c with an identifier 20d of a data file 21a. In other words, any one (or more) of the collection objects 19a-c may represent a second data item including a reference to third data item, and the data file 21a may represent a second data item including payload data, for example an image.

By appointing the collection object 19a as a root collection object, the collection object 19a may represent a root directory 19a of the storage system. Analogously, the collection object 19b may represent a subdirectory 19b of the root directory 19a. The collection object 19c may represent a subdirectory of the subdirectory 19b. The data file 21a may represent a data file stored in the subdirectory 19c. The collection objects 19a-c may thus define a hierarchical storage structure. The structure may be referred to as a directory tree.

In order to implement large storage systems spanning over multiple networks, the data item identifiers 20a-d may include two data elements. The first data element may be a cluster ID that may identify the cluster where the data item (collection object 19a-c or data file 21a) is located. The cluster address may be a multicast address so that the API may send a request for a data item to a specific cluster using the multicast address. The second data element may a data item ID formed by a unique number that identifies the data item 19a-d inside the cluster. The unique number may be a number of a specified length, e.g. 128 bits, enabling a large number of data items to be uniquely identified within the cluster. By this arrangement a collection object in one cluster may reference another collection object or data file in another cluster. In other words, the first and second unique key may include a cluster address pointing out a subset of the storage nodes within the system, and a data item identifier identifying a data item within the subset of storage nodes.

Referring back to FIGS. 1 and 2, the server 7 may for example include a register indicating a storage node 15 storing the collection object (e.g. collection object 19a) associated with a specific identifier (e.g. identifier 20a). In an example, the collection object 19a may be located using the read method disclosed in U.S. patent application Ser. No. 13/125,524, filed Apr. 21, 2011, the contents of which are hereby incorporated by reference herein. Briefly, according to this read method the server 7 or a storage node 15 may send a multicast message to the plurality of storage nodes 15. The multicast message may include the identifier 20a of the desired collection object 19a. Each storage node 15, in response to receiving the multicast message, may scan its storage medium 17 after a collection object having said identifier. If found the storage node 15 may respond and indicate that it stores the object sought-after to the originator of the multicast message. The collection object 19a may then be accessed by means of a unicast request sent to a responding storage node 15 storing the collection object 19a.

It is noted that there may be other methods of locating the collection object.

In an example embodiment the server 7 may use cached information for accessing the data items in the system, for example the identifier (i.e. the identifier 20a) or key to the data item (e.g. the collection object 19a) stored at the responding storage node 15. The identifier or key to the data item may be stored in a memory at the server 7, which may make it accessible by the API. In addition, the server 7 may store status information associated to the storage node 15. In an example, the identifier and/or the status information may be stored in a memory at one, or several, of the storage nodes 15 included in the data storage system 13.

The status information about the collection object 19, or more generally the data item, may include, in addition to the storage location information, information about a current load condition of the storage node 15 storing the data item, information regarding which version of the data item that is stored in the storage node 15, information about which API 11 and/or server 7 (in case there are many) that updated, or created, the version of the data item that is stored in the storage node 15, information about the data storage availability, information about a system age of the storage node, positional information of the storage node, and/or the like.

In an example, the status information associated to a particular data item may be provided to the API 11 at regular time intervals.

In an example, the status information associated to particular data item may be provided to the API 11 each time the corresponding storage node 15 storing the data item is participating in an operation in the data storage system 13. Example operations may include a reading operation, a writing operation, a creating operation and/or an updating operation.

Figure 3:
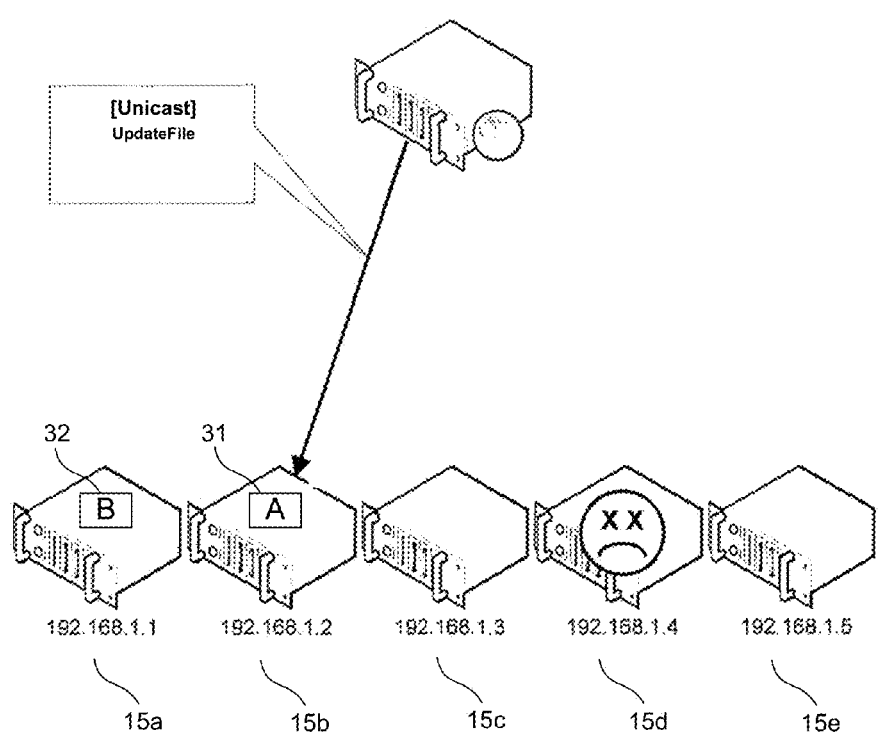
FIG. 3 schematically illustrates an example of a data updating process.
Figure 4:
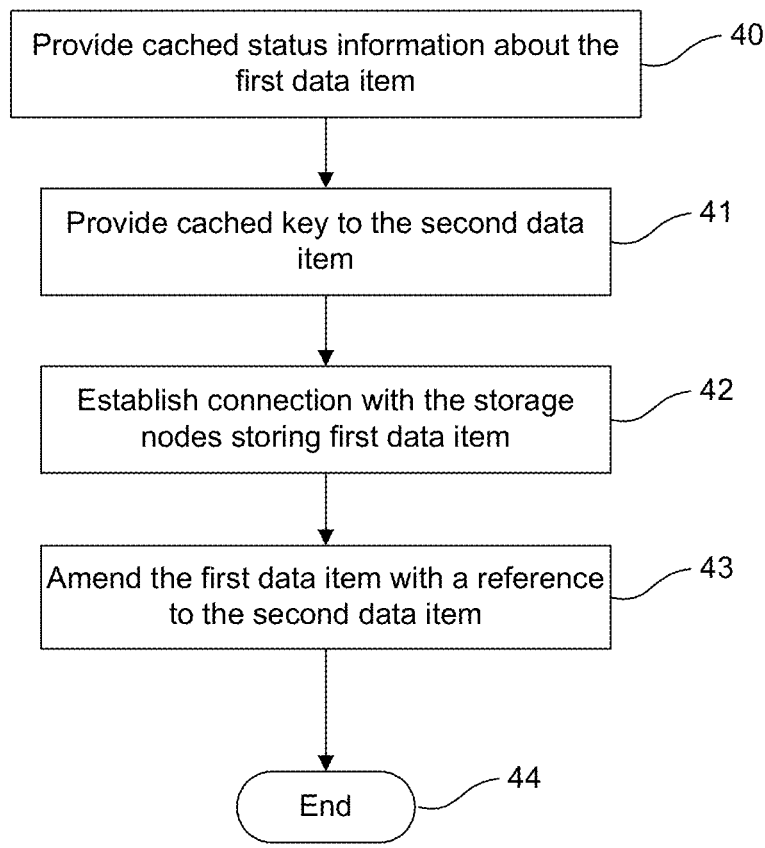
FIG. 4 is a flow chart illustrating an example a method for updating data in a data storage system.

The operation of the data storage system will be described with reference to FIG. 3 and FIG. 4. More specifically, the method of updating data in the data storage system 13 will be described. FIG. 3 schematically illustrates an example embodiment of a data updating process. FIG. 4 illustrates a corresponding flow chart of an example method for updating data. Note that the exact order of the steps performed according to FIG. 4 may be altered.

In the following disclosure, the first data item 31 may be a collection object (e.g. the collection object 19b) including a set of references. The second data item 32 may be another collection object (e.g. the collection object 19c). In another example, the second data item may be a data file comprising payload data (e.g. an image file). The details about the data items have been described in the above. For example, the first 31 and/or the second 32 data item may be stored at additional storage nodes 15a-e. In an example embodiment a single data item (e.g. the first data item 31) is to be updated. According to this embodiment, the data item may be any kind of file that needs to be updated/appended with new data (e.g. updates other than updating a collection object with a new reference). Also in this embodiment the cached information disclosed above (and in more detail below) may be used for accessing the data item.

In block 40, one of the APIs 11 in the server 7 may be provided with status information about the first data item 31 (i.e. the collection object 19b). More specifically, the server 7 may resolve the path to the first data item 31 by utilizing cached storage location information about the first data item 31. For example, as described above, the storage location information, possibly along with additional status information, may be gained from a previously performed data retrieval process, for example according to the method as disclosed in U.S. patent application Ser. No. 13/125,524. It is understood, however, that also other methods for gaining the status information about the first storage data item 31 are conceivable. For example, the storage node 15 storing the first data item 31 may provide the server 7 with status information, including storage information, at regular time intervals.

The status information about the first data item 31 may be stored at the server 7. According to another example, the status information may be additionally or only stored at one or more of the storage nodes 15a-e. According to yet another example, the status information may be stored at an external device, other that the server 7 and the storage nodes 15a-e, in communication with the storage nodes 15a-e.

The cached storage location information may include information about which of the storage nodes 15a-e may store the first data item 31. For example, the storage location information may provide their IP addresses, as well as about the key to the first data item 31 stored at these storage nodes. In FIG. 3, the storage node 15b may store the first data item 31, which is indicated by the letter A. It should be noted, that the first data item 31 may be stored at additional several storage nodes 15a-e.

In block 41, the API 11 in the server 7 may be provided with the key to the second data item 32 (e.g. the collection object 19b) by utilizing cached information about the key. Similarly to the above, this information may have been gained from a previously performed data retrieval process and may be stored at the server 7 and/or at one or more of the storage nodes 15a-e.

In FIG. 3, the storage node 15a may store the second data item 32, which is indicated by the letter B.

In block 42, the API 11 in the server 7 may establish a connection with the storage nodes 15b storing the first data item 31, for example by utilizing the cached storage information about which of the storage nodes 15a-e may store the first data item 31. The connection may be established by utilizing their IP addresses. This connection may be implemented by means of unicast, see FIG. 3. However, other types of connections, such as multicast or broadcast, are also conceivable.

In block 43, the first data item 31 (e.g. the collection object 19b) may be amended with a reference (e.g. the reference 22b, which may include the identifier for the collection object 19c) to the second data item 32, at which point (e.g., block 44), the updating process may be complete.

In one example, there may be several already existing keys in the first data item 31, and in the updating process the cached key to the second data item 32 may be added to this list of keys in the first data item 31.

In another example, there may be a data file included in the first data item 31, and in the updating process the data file may be overwritten by the second data item 32. In an example, the second data item 32 may substantially correspond to the data file.

The updated first data item 31 (e.g. the collection object 19b including the reference 22b) may be stored at the server 7. This stored information about the updated first data item 31 may be utilized for future applications in the data storage system 13, such as reading, writing or updating operations of data items comprised in the data storage system 13.

In an example, the act of updating the first data item 31 may be arranged to not occur or to be interrupted on condition that the size of the second data item 32 exceeds a predetermined value. An example predetermined value may be 512 kilobyte (kB).

Storage node 15a, storing the second data item 32, may not actively participate in the updating process according to an example. The first 31 and second 32 data items may already be stored at the storage nodes 15, and in the updating process according to the present embodiment an appropriate directory structure is provided, for example by amending the first data item 31 with the reference.

As mentioned above, additional storage nodes 15a-e may also store the first data item 31. For example, the storage node 15d in FIG. 3 may store the first data item 31, but may not participating in the updating process, for example due to a malfunction.

In an example, at least one of the storage nodes participating in the updating process may send an acknowledgement to the API 11 included in the server 7 participating in the updating process. The acknowledgement may include information about the performance of the updating act. In particular, the acknowledgement may include information about whether the updating process was successful or not. Additional status information may be included in the acknowledgement.

Additionally, if the updating process fails in more than a predetermined fraction of the storage nodes 15, for example more than 50%, a replication of at least one of the first data item 31 and the second data item 32 at some of the storage nodes 15 may be performed.

It may happen that a data item stored at two or more storage nodes 15 are being updated substantially simultaneously by two different APIs 11. These APIs 11 may be included in the same, or alternatively, at different servers. The contents of the respective updating processes may differ, thereby giving rise to versions of the data item having different contents. In this case, a selection procedure may be initiated in which one of the versions are selected and thereafter stored at the different storage nodes. Optionally, all the different versions may be stored at the storage nodes.

The selection procedure may be implemented as follows in an embodiment wherein two APIs (e.g. API1 and API2) are in the process of updating a data item which is stored at three different storage nodes (e.g. storage nodes SN1, SN2 and SN3). The data items stored at the respective storage nodes are associated to specific version numbers and to information about which API that updated the version of the data item. This version number and API information may be stored in the data sets at the storage nodes as well as at the APIs. In the following, the version number V and API information N are collectively denoted by the version data (V|N). For example, the version data (34|2) means that the version number 34 of the data item has been updated by the second API (e.g. API2).

The storage nodes are arranged to send acknowledgements to at least one of the APIs including information about whether the updating process was successful or not. Moreover, the acknowledgements may include the version data, e.g. (V|N), associated to the updated data item.

For example, at a particular time instant, it may be that all the data item has the same version number, say version number V=25. The data items stored at the first two storage nodes (e.g. the storage nodes SN1 and SN2) may both have previously been updated by the first API (e.g. API1). However, before the first API had the time to do so, the second API (e.g. API2) managed to update the data item stored at the third storage node (e.g. storage node SN3). Put differently, the first API managed to update the data items stored at the first and second storage nodes with version 25 before the second API had the time to do so. The acknowledgements sent back to the APIs, as well as the information stored at the storage nodes, thereby may include the version data (25|1), (25|1) and (25|2), for the data items stored at the first, second and third storage node, respectively.

Thus, when the first API at a subsequent time instant attempts to update the third storage node with its version 25 of the data item, this updating may be arranged to not occur since there is already a version 25 stored at the third storage node as sent from the second API. Moreover, when the second API at a subsequent time instant tries to update the first and second storage nodes, the updating of these may not occur, since there are already versions 25 at the first and second storage nodes as sent from the first API.

The APIs receiving the acknowledgements including the version data may be arranged to instruct the storage nodes included in the data storage system 13 to keep the data item having the version data (V|N) of the data item which is most frequently occurring in the received acknowledgements. For example, if the version data (V|N$_{max}$) of the data item occurs in more than 50% of the acknowledgements, this data item may be kept. In the following, the data item associated to a version data (V|N) may be referred to as a correct version if it is to be kept (e.g., it may be associated with version data (V|N$_{max}$) and/or may be included in more than 50% of the relevant storage nodes) and a wrong version of the data item (e.g., it may not be associated with version data (V|N$_{max}$) and/or may be included in less than 50% of the relevant storage nodes).

The APIs may be arranged to send instructions to the storage nodes keeping the wrong versions to delete the wrong versions of the data item. Moreover, wrong versions of the data item may be replaced, or alternatively amended, by the correct versions of the data item at these storage nodes by means of the APIs instructing the storage nodes to send the correct version. In another example, the other storage nodes included in the data storage system 13 may send the correct version, for example according to the method as disclosed in U.S. patent application Ser. No. 13/125,524. It should be noted that the wrong versions of the data item may either be replaced, supplemented, or overwritten. In another example, the wrong versions may be amended, in which case the parts of the correct version which differ from the wrong version in question may be added to the wrong version of the data item. Thereby, the data from the wrong versions may be kept in the data storage system.

Thus, in the example involving the three storage nodes and the two APIs, version 25 as sent from the first API may have version data (25|1). Version (25|1) may be kept as the correct version 25, since this version has been successfully stored at two storage nodes (e.g., SN1 and SN2).

In another example, the data item sent from the second API (e.g. API2) to the third storage node (i.e. SN3), may be determined to be the wrong version. The determination may be based on the fact that less than half of the storage nodes include this version and/or that more storage nodes store another version as compared to the number that store this version. In an example, the wrong version may be resent to all of the storage nodes with a new version number, e.g. version number 26. This data item will then be associated with the version data (26|2).

According to another embodiment, a backup process may be initiated in case the updating process fails. For example, the server 7 may multicast a query about at which storage nodes 15a-e the first 31 and second 32 data item are stored as well as their keys. The updating process may then be executed in accordance with the above.

The updating process described above may be repeated as many times needed for updating a specific hierarchical storage structure in the data storage system 13.

More specifically, the updating process may be repeated by reiterating the steps described above in relation to FIGS. 3 and 4 while at the applying the update process to data items farther down the virtual directory tree. In a first reiteration, rather than updating the first data item 31, the second data item 32 (e.g. the collection object 19c) may be updated. A third data item (e.g. the data file 21a) may also be updated, for example after the second data item has been updated. As a result of the updating process, the second data item 32 may be updated with a reference (e.g. the reference 22c comprising the identifier for the data file 21a) to the third data item.

Additional reiterations proceed in analogy with the first reiteration.

According to an another embodiment, the method for updating the data items may further include storing the second data item 32 at one or several storage nodes 15. The storage nodes 15 having the lowest load conditions, the largest free storage space available, or similarly, may be selected for the storage.

For example, the second data item 32 may be stored by sending a unicast message which may include the second data item 32 and/or instructions for storing the second data item 32. The instruction may be sent on condition that the receiving storage nodes 15 fulfill a set of criteria. The set of criteria may be predetermined or change with time according to an network and/or device conditions. This set of criteria may include a minimum available free storage space, a maximum load condition, a maximum system age, a desired geographical range for the storage nodes are to be found within, and/or the like. Moreover, a corresponding reference to the second data item 32 may be provided, for example to create an appropriate hierarchical storage structure according to the above.

The storage nodes 15 may be adapted to store the second data item 32 on a further condition that the size of the second data item is smaller than a predetermined value.

According to an example, the reference to the second data item 32 present in the first data item 31 may be deleted. For example, the second data item 32 may be erased from all the storage nodes 15 storing it.

A method for retrieving data from the data storage system 13 is also disclosed herein. The method may include the sending of a multicast message to a plurality of storage nodes 15. For example, there may be five storage nodes each having an IP (Internet Protocol) address 192.168.1.1, 192.168.1.2, etc. The number of storage nodes is, needless to say, just an example. The query may contain a data identifier, for example "2B9B4A97-76E5-499E-A21A6D7932DD7927", which may be a Universally Unique Identifier (UUID). The multicast message may include a request for each of the storage nodes to send a specific data item on a condition the data item is stored at the storage node in question.

The storage nodes may scan themselves for data corresponding to the identifier. If such data is found at some of the storage nodes, a response may be sent which may be received by the server 7. More specifically, each of the storage node/ nodes 15 storing the requested data item may transmit a response to the server 7. The response may include an instance of the requested data item from the storage node/ nodes 15.

The response may contain further information in addition to an indication that the storage node has an instance, or copy, of the requested data. For example, the response may contain information from the storage node directory about other storage nodes containing the data, storage location information, information regarding which version of the data item is contained in the storage node, information about which API and/or which server, that created the version of the data item that is contained in the storage node, information about a free storage space available at the storage node, information about a system age of the storage node, information regarding the current load the storage node, and/or the like.

If, the data item is not stored at a particular storage node, this storage node may be silent or may send reference data to the server. This reference data may include information that the requested data item is not stored at the storage node in question, and may in addition include information about the storage node, such as a current load condition, information about a current data storage availability, storage location information, information about a system age of the storage node, and/or the like.

The received data items from the storage nodes may be analyzed to check whether at least one instance of the requested data item has a maintained integrity. By a maintained data integrity of a data item is meant an intact condition of a data item as compared to an original data item, up to certain acceptable data discrepancies. In other words, a data item may have a maintained data integrity if the currently stored item has not been edited or changed such that it varies from the data that was intended to be stored (e.g., the most recently saved data version on that storage node).

The act of analyzing may be implemented by analyzing received data from one storage node, from two storage nodes, or alternatively from several storage nodes. The analysis of the data integrity may, for example, be performed in the server. As an example, the analysis may be implemented by means of a checksum algorithm, a cryptographic hash function such as MD5 (Message-Digest Algorithm), a comparison of portions of some or all of the different instances of the requested data item, a comparison with a reference data item, and/or the like.

As a consequence of the analysis, it may be established whether the integrity of some of the received data items from the storage nodes has been properly maintained or not. If at least one instance of the requested data item has a maintained a desired integrity, an instance of data with the desired integrity may be selected. If several instances of the requested data item have a maintained integrity, one of these may be selected depending on a set of additional criteria. The criteria may for instance include a current load condition of the storage nodes, geographical positions of the storage nodes, a system age of the storage nodes, and/or other characteristics of the storage nodes. Alternatively, the storage node having the latest version of the requested data item and/or the lowest load may be selected.

In an example, one instance of the requested data item with a maintained desired integrity, for example the received data from the storage node, may be selected. The received data item from the other storage node may be discarded, for example irrespective of whether this data item also has a maintained integrity. In an example, the received data item from the other storage node may be stored as reference data, for example at the server 7.

In an example, if the integrity of the at least one instance of the requested data item is maintained at the desired level, a further analysis of the data items received from additional storage nodes may be aborted or interrupted.

In one example, one may compare a number of instances of the requested data item, for example two instances, and interrupt checking additional received data items if these two instances agree to a desired accuracy or comply with a desired integrity state of the data.

In another example, the comparison between different instances may be interrupted when a certain fraction of the total number of instances agrees to a desired accuracy. Typical fractions may be 50%, 60% or 70%, but also other fractions may be equally conceivable.

A desired accuracy may be that the compared data items fully agree, certain portions of the compared data items fully agree, and/or that certain portion agree to some specified margin (e.g. 99% agreement). In some instances, however, a less strict desired accuracy may be sufficient.

For example, the data integrity may be lost when the connection between the server 7 and some of the storage nodes 15 is corrupted such that the transfer of the requested data item fails. The data may also be corrupted and lose integrity when the data storage system suffers from some other malfunction. For example, a storage node storing the requested data item may not be working properly. In this example, the malfunctioning storage node may be unable to transmit an instance of the requested data. If a transfer of data from some of the storage nodes fails, the server may select another storage node, or set of storage nodes, for the retrieval of data.

If no instance of the requested data item from the storage nodes has a maintained integrity, a new multicast message may be sent to the storage nodes, and the steps described above may be repeated. This recursive processing may be reiterated until an instance of the requested data item with a maintained integrity has been received from some of the storage nodes 15, or alternatively, until a predetermined number of iterations have been performed.

In an example, the server 7 may send a unicast message to the storage node associated to the data item having a lost integrity, and the message may include information about the nature of the failed transfer, information about the received data item, and/or the like.

The present method for retrieving data is particularly efficient when a majority of the data items to be handled by the data storage system are small and a minority of the data items to be handled are large. What is considered a small or large data item may depend on the system capabilities, such as connection speeds between the various entities comprised in the system, storage capabilities, and/or the like. Definitions of small and large data may vary from system to system (e.g. "small" may imply data blocks with sizes less than or equal to 512 kB and/or less than a predetermined fraction of the data bandwidth available in the system).

If the majority of the data items to be handled by the system are considered to be small, one may assume that the size of all the data items to be retrieved is small. Moreover, if the size of the data to be retrieved exceeds a predetermined value, the transmittal from the storage node storing this data, as well as from the additional storage nodes storing instances of this data, to the server may not occur or may be halted, aborted, stopped, interrupted, etc. This decision may be made locally at the storage nodes storing the data to be retrieved and/or by the server.

For example, the storage nodes storing the data to be retrieved may send reference data back to the server, which may include information about the sizes and the storage locations of the data items which were supposed to be sent, file handles, and/or additional relevant information about the storage nodes, such as a current load condition, a free storage space available, a system age, position information, etc. In addition, the reference data may include instructions for the server to retrieve the data item from a particular set of the storage nodes storing the requested data. In one example, the data item may be retrieved from one particular storage node by means of a unicast communication.

In the above the embodiments mainly have been described with reference to a limited number of examples. However, as is readily appreciated by a person skilled in the art, other examples than the ones disclosed above are equally possible within the scope of the disclosure, as defined by the appended claims.

What is claimed:

1. A method for updating data stored in a data storage system, the data storage system including a plurality of storage nodes, the method comprising:

determining status information regarding a first data item, wherein the status information comprises an indication of identities of one or more data storage nodes that store the first data item, the first data item comprises a collection object that references one or more other data items in the data storage system, and the one or more other data items comprise at least one other collection object;

determining an identifier for a second data item stored on a second storage node, wherein the identifier uniquely identifies the second data item within the data storage system;

sending an update message for the first data item to a first storage node based on the status information indicating that the first storage node is one of the one or more data storage nodes that store the first data item, wherein the update message indicates that the identifier for the second data item is to be included in a reference to the second data item within in the collection object of the first data item;

determining that at least one data storage node that stores a version of the first data item is storing a version of the first data item with different contents than are included in a version of the first data item stored at the first data storage node; and determining which version of the first data item should be stored in the data storage system by selecting an instance of the first data item that is stored at a largest number of data storage nodes as the version of the first data item that is to be distributed in the data storage system.

2. The method according to claim 1, wherein the update message is sent using an application programming interface (API).

3. The method according to claim 2, wherein the API is implemented on a server in communication with said first and second storage nodes.

4. The method according to claim 2, wherein the API is implemented in a storage node included in the data storage system.

5. The method according to claim 1, wherein said status information is cached from a previous access to said first data item.

6. The method according to claim 1, wherein said identifier is received prior to receiving the status information, the method further comprising saving the identifier in a memory cache.

7. The method according to claim 1, further comprising sending a subsequent update message to append data to an existing data file included in said first data item or to overwrite an existing data file included in said first data item.

8. The method according to claim 1, wherein said status information comprises a key for the first data item and one or more Internet Protocol (IP) addresses for the data storage nodes that store the first data item.

9. The method according to claim 1, wherein said status information comprises information about an amount of free storage space at said first storage node.

10. The method according to claim 1, wherein said status information comprises information about a load condition at said first storage node.

11. The method according to claim 1, wherein the update message is sent on condition that the size of said second data item is less than a predetermined value.

12. The method according to claim 1, wherein said status information about said first data item is provided at regular time intervals.

13. The method according to claim 1, further comprising receiving an acknowledgement from the first storage node, wherein said acknowledgement comprises information regarding the first storage node.

14. The method according to claim 13, wherein said acknowledgment is a negative acknowledgement, and the method further comprises re-sending the update message for the first data item.

15. The method according to claim 1, wherein the update message is sent as a unicast message.

16. A server comprising a processor and memory, the processor being configured to:
  determine status information regarding a first data item, wherein the status information comprises an indication of identities of one or more data storage nodes that store the first data item, the first data item comprises a collection object that references one or more other data items in the data storage system, and the one or more other data items comprise at least one other collection object;
  determine an identifier for a second data item stored on a second storage node, wherein the identifier uniquely identifies the second data item within the data storage system;
  send an update message for the first data item to a first storage node based on the status information indicating that the first storage node is one of the one or more data storage nodes that store the first data item, wherein the update message indicates that the identifier for the second data item is to be included in a reference to the second data item within in the collection object of the first data item;
  determine that at least one data storage node that stores a version of the first data item is storing a version of the first data item with different contents than are included in a version of the first data item stored at the first data storage node;
  determine which version of the first data item should be stored in the data storage system by selecting an instance of the first data item that is stored at a largest number of data storage nodes as the version of the first data item that should be stored in the data storage system; and
  send a message indicating the version of the first data item to be stored to at least one storage node that stores a different version of the first data item.

17. The server according to claim 16, wherein the server comprises an Application Program Interface (API).

18. A storage node comprising a processor and memory, the processor being configured to:
  send status information to a server regarding a first data item, wherein the status information comprises an indication of identities of one or more data storage nodes that store the first data item, the status information indicates that the storage node is one of the one or more storage nodes that store the first data item, the first data item comprises a collection object that references one or more other data items in the data storage system, and the one or more other data items comprise at least one other collection object;
  receive an update message for the first data item from the server, wherein the update message indicates an identifier for a second data item stored on a second data storage node and the identifier uniquely identifies the second data item within the data storage system;
  update the first data item to include a reference to the second data item based on the received update message, the reference comprising the identifier; and
  send a local version of the data of the first data item to another data storage node that stores a different version of the first data item, wherein the local version of the first data item is sent to the another storage node based on the local version of the first data item being stored on a greater number of data storage nodes than store the different version of the first data item.

* * * * *